Aug. 12, 1969    H. J. MODREY    3,460,209
COUPLING
Filed Jan. 26, 1968    2 Sheets-Sheet 1
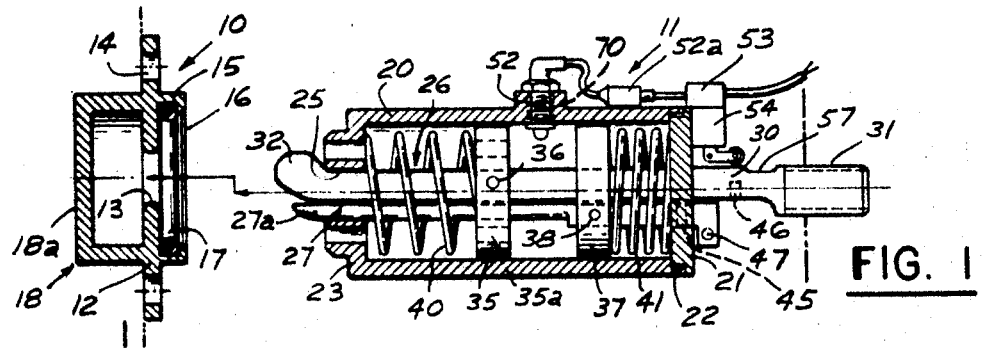
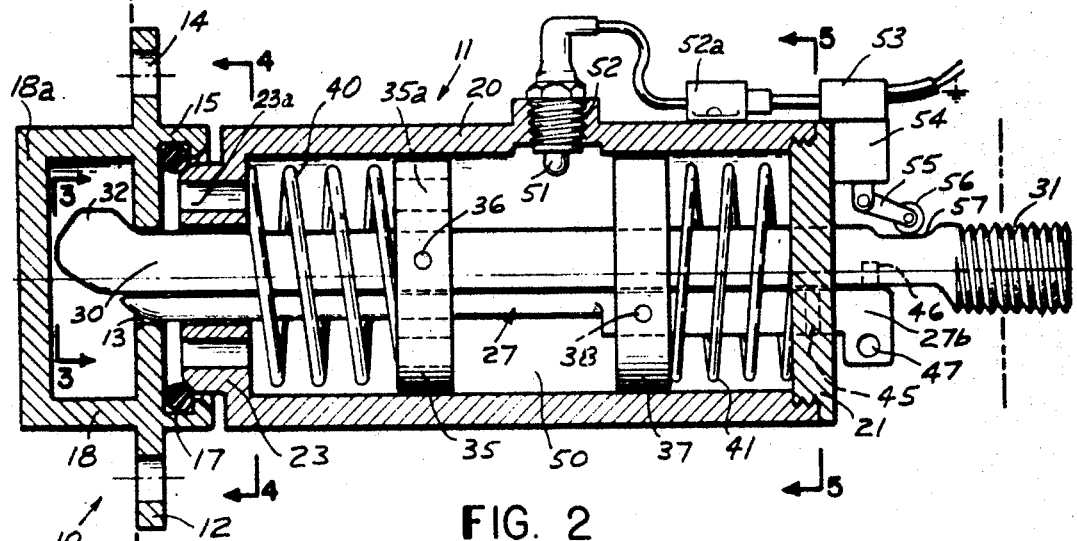
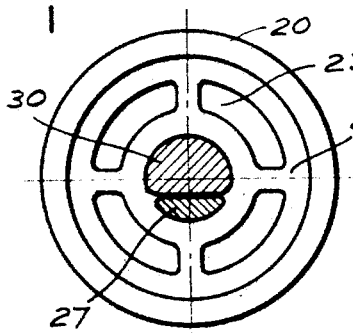
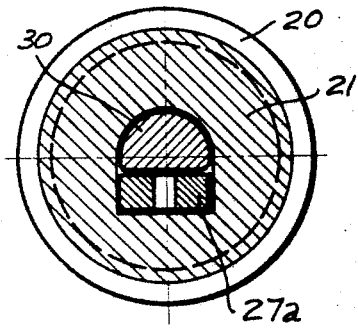
INVENTOR.
HENRY J. MODREY
BY Hane and Baxley
ATTORNEYS 3,460,209
COUPLING
Henry J. Modrey, Eagle Drive,
Stamford, Conn. 06903
Filed Jan. 26, 1968, Ser. No. 700,953
Int. Cl. F16b 21/09; F15b 21/06
U.S. Cl. 24—211                                    11 Claims

ABSTRACT OF THE DISCLOSURE

There is disclosed a two-part coupling in which the engaging coupling member is locked to the receiving coupling member by lodging a clamping rod and a locking slide in a receiving opening of the receiving coupling member. Release of the coupling is effected by first withdrawing the locking slide from the receiving opening and then separating the clamping rod and with it the entire engaging coupling member from the receiving coupling member. Both the engaging movement and the disengaging movement of the engaging coupling member are substantially linear movements. Separation of the engaging coupling member from the receiving coupling member is effected by generating within the engaging coupling member a pressure wave which first causes withdrawal of the locking slide thereby unlocking the clamping rod, and then ejection of the engaging coupling member from the receiving coupling member.

The coupling is designed especially for use under conditions under which the gravitational force is minimal or absent.

The invention

The present invention relates to releasable self-locking couplings and connectors having an engaging member and a receiving member and more particularly, to "Interlock" connectors and couplings as they are disclosed in prior patents of the applicant such as Patents 2,464,543 and 2,990,597.

Interlock type couplings and connectors comprise an engaging member including a clamping rod having at one end a one-sidedly overhanging clamping head and a locking slide slidable along the clamping rod and urged by a spring toward the clamping head, and a receiving member having a receiving opening therethrough. The peripheral outlines of the clamping head and of the slide are so correlated that the combined peripheral outline of the head and the slide is in excess of the peripheral outline of the receiving opening and that the peripheral outline of the head alone and also the combined peripheral outline of the clamping rod just below the head thereof and of the slide just fit the peripheral outline of the receiving opening. To lock the engaging member to the receiving member, the clamping head is inserted into the receiving opening. When now the two members are pressed toward each other, the clamping head will penetrate deeper into the receiving opening but the slide will abut against the rim of the receiving opening and is thus pushed back in reference to the clamping head against the action of its spring.

After the clamping head has passed substantially completely through the receiving opening and the same is occupied by the clamping rod, space in the slide becomes available in the receiving opening and the slide is now snapped forward by the spring and enters the receiving opening alongside the rod.

As a result, the clamping head is forced from its initial position aligned with the receiving opening into a position overlying the receiving member on the side thereof opposite to the one from which the clamping head is inserted whereby the clamping head and thus the engaging member are locked to the receiving member.

To release the engaging member from the receiving member the slide is withdrawn from the receiving opening thereby making space available for return of the clamping head into its position aligned with said opening so that the clamping head can now be pulled out of the receiving opening.

An analysis of the release of self-locking couplings and connectors of the interlock type and of other known connectors and couplings, shows that release of the coupling or connector involves two operational steps, namely, unlocking the engaging member from the receiving member and then physically separating the two members.

In many instances a force causing the actual separation of the engaging member from the receiving member is automatically present. Gravitational force or a tensile load will cause the engaging member after the same is unlocked simply to slide out of the receiver, often assisted by the weight of the components attached to the engaging member. If the coupling is used as a tensile device attached for instance to a cable, the pull of the cable effects automatically separation of the two coupling members after an unlocking of the same.

However, in some fields of application such self-acting separation forces are not present or at least not sufficiently. For instance, when cables or pipes depend at substantially right angles to the connector axis, the weight of the components will not apply a force to the unlocked clamping rod causing the same to slide out of the receiving member. Even if the coupling is more or less downwardly slanted the friction within the coupling may be sufficient to retain the clamping head and with it the engaging coupling member within the receiving coupling member. In space conditions, the gravitational force is more or less absent. Hence, the engaging coupling member will remain within the receiving coupling member even after the clamping rod is unlocked.

Accordingly, the provision of a positive separation force is mandatory in all fields of application in which such force is not inherently present. Moreover, in many fields of application in which a self-separation of the two coupling members can be normally expected, the provision of a positive separation force is often advantageous as a safety means.

It is a broad object of the invention to provide a novel and improved coupling of the general kind above referred to in which the engaging member and the receiving member are separated from each other when desired by applying a positive ejection force to the engaging coupling which is independent of the presence or absence of a separating force such as a gravitational force or a pull applied to the engaging coupling member after unlocking the same.

Another object of the invention is to provide a novel and improved coupling of the general kind above referred to in which the engagement movement and the separation movement of the engaging coupling member are substantially linear movements. In contradistinction thereto, with couplings as heretofore known for the purpose, the engaging coupling member when separated from the receiving coupling member sets up angular power vectors. As is evident, ejection of the engaging coupling member is virtually impossible, or at least more difficult in the presence of an angular power vector as said vector is bound to cause jamming of the engaging coupling member in the receiving coupling member.

The linear movement of the engaging coupling member according to the invention makes the same uniquely suitable for use under space conditions, that is when the gravitational force is more or less absent.

Another more specific object of the invention is to provide a novel and improved coupling of the general kind above referred to in which a pressure wave generated by detonation of a suitable explosive charge or by pressurized air is caused to act first upon the locking slide for unlocking the clamping rod, and then upon the housing of the engaging coupling member to eject the same from the receiving coupling member of the clamping rod.

Other and further objects, features and advantages of the invention are pointed out hereinafter and set forth in the appended claims which constitute part of the application.

Summary of the invention

The invention resides in abruptly generating within a chamber formed in the housing of the engaging coupling member a pressure wave which first acts upon the locking slide of the engaging coupling member so as to withdraw the slide from the receiving opening of the receiving coupling member and then exerts by its remaining momentum an ejection force upon the now released clamping rod and the housing of the engaging coupling member thereby causing a positive separation of the engaging coupling member from the receiving coupling member in a substantially linear direction.

In the accompanying drawing, several preferred embodiments of the invention are shown by way of illustration and not by way of limitation.

In the drawing:

FIG. 1 is a lengthwise sectional view showing the engaging member and the receiving member of the coupling separated from each other;

FIG. 2 shows the two coupling members applied to each other on an enlarged scale;

FIG. 3 is a fragmentary view in the direction indicated by arrows 3—3 in FIG. 2;

FIG. 4 is a sectional view along lines 4—4 of FIG. 2;

FIG. 5 is a sectional view along lines 5—5 of FIG. 2; and

Figure 6:
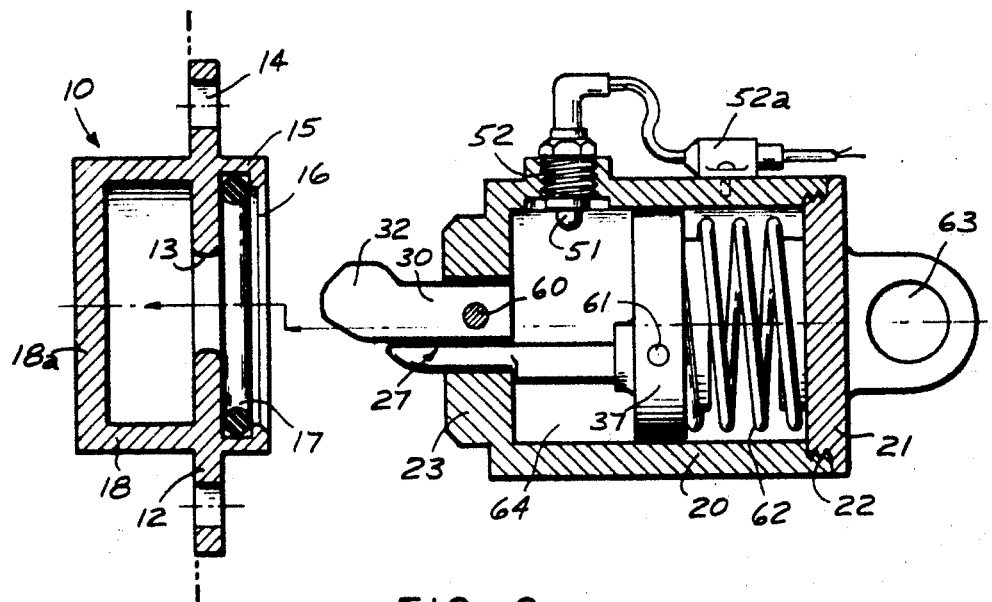
FIG. 6 is a lengthwise sectional view of the receiving member and the engaging member of the coupling separated from each other, the engaging coupling member being modified.

Referring now to FIGS. 1 to 5 inclusive more in detail, the exemplified coupling shown in these figures comprises a receiving coupling member 10 and an engaging coupling member 11. The receiving coupling member comprises a locking plate 12 including a receiving opening 13. Plate 12 may be visualized as being secured to a larger structure, for instance, by screw bolts extending through openings 14. The righthand side of the plate which constitutes the receiving side thereof has protruding therefrom a turned-in flange 15 defining an opening 16. The flange and the opening therein form a guide for the coupling member, as will be described more fully hereinafter. A sealing ring such as an O-ring 17 may be fitted in the flange to effect a seal between the two coupling members, as will be also more fully described hereinafter.

The receiving opening 13 in plate 12 is covered by a box-like member 18. However, the provision of such cover member is not essential for the device. It is only necessary that space is available behind the locking plate.

The engaging coupling member comprises a generally tubular housing 20 closed at one end by a wall 21, which may be detachably secured to the housing, for instance, by a screw connection indicated at 22. The other end of the housing is closed by an end wall 23, which may also be detachably secured to the side wall of the housing, or may be integral therewith as shown. End wall 23 has a central opening 25 therethrough for passage of a clamping rod 26 and a locking slide 27.

The clamping rod comprises a bolt-like rod 30 slidably extended through end wall 21. The protruding end of the rod may preferably terminate in a structure for conveniently securing the clamping rod to a utilization device (not shown). There is shown an enlarged externally threaded part 31 upon which may be threaded a bolt or other component constituting part of or leading to the utilization device. The other end of rod 30 terminates in a clamping head 32, one-sidedly overhanging the shaft, as is clearly shown in FIGS. 1, 2 and 3.

Locking slide 27 is disposed parallel to the clamping rod on the side thereof opposite to the one which is overhung by the clamping head 32. The slide can slide in reference to the clamping rod parallel thereto and for this purpose is slidably guided in the housing. As can best be seen in FIG. 3, both rod 30 and slide 27 are flattened at the surfaces at which they face each other so that they can move relative to each other in close relationship. The end of the slide adjacent to the clamping head is preferably tapered and rounded off, as is indicated at 27a; the other end of the slide may be reinforced and extends slidably through end wall 21.

The maximal transverse peripheral outline of clamping head 32 is such that it just fits through receiving opening 13 in locking plate 12. The combined peripheral outline of rod 30 and slide 27 is such that the rod and the slide also just fit through opening 13. As can best be seen in FIG. 3, the combined peripheral outline of the rod and the slide is substantially circular and accordingly opening 13 is also substantially circular. The combined peripheral outline of the clamping head and the slide are in excess of the peripheral outline of opening 13 so that the clamping head cannot pass through the receiving opening 13 in plate 12 when the slide is alongside the clamping head, as is shown in FIG. 1.

A piston 35 is slidable in the housing and secured to the clamping rod by suitable means such as a pin 36. A second piston 37 slidable in the housing is secured to the slide by suitable means such as a pin 38. A loaded coil spring 40 abutting on one end against end wall 23 of the housing and on the other end against piston 35 urges the latter, and with it the clamping head, toward the right. A second loaded coil spring 41 abutting on one end against end wall 21 of the housing and on the other end against piston 37 urges the latter, and with it the locking slide, toward the left. Spring 40 is a heavier spring than spring 41.

The end 27b of the locking slide which extends through end wall 21 has preferably a rectangular cross-section, as can best be seen in FIG. 5, to guide the slide along the clamping rod which preferably has the cross-section shown in FIG. 5. A bore 45 through the locking slide and a bore 46 in rod 30 serve to lock the locking slide in its withdrawn position in reference to the clamping rod by inserting a pin or similar suitable component into the two bores.

An eye 47 in the protruding end portion of the locking slide serves to withdraw the slide in reference to the clamping rod against the action of spring 41. Such withdrawal of the locking slide may be effected by remote control, for instance by securing one end of a wire in the eye and the other end to the core of a solenoid.

As is clearly shown in FIGS. 1 and 2, pistons 35 and 37 define therebetween a chamber 50, the volume of which is variable depending upon the positions of the two pistons in reference to each other, but will always be present to a certain extent. A means for temporarily generating a high pressure in chamber 50 communicates with the chamber in any position of the two pistons in reference to each other. This pressure generating means may be a nozzle connected to a source of highly pressurized air, or as preferred and shown a squib 51 which is exchangeably secured in the wall of housing 20. There is shown as carrier for the squib a threaded cartridge 52 which can be screwed into and out of the housing wall. The cartridge further includes a detonator 70 of conventional design which is connected via a suitable actuating circuitry also of conventional design and indicated by a block 53 to a source of current. The block is connected to the cartridge via a cable connector 52a. As is evident, activation of the detonator by closing its energizing circuit will cause explosion of the squib which in turn generates a gas pressure in chamber 50.

A switch of conventional design indicated by a block 54 is connected into the energizing circuit of the detonator and so arranged that the detonator can be activated when the switching position of switch 54 is changed. The switch is controlled by a switch arm 55 terminating in a roller 56 movable along an elongate groove 57 in the protruding end portion of rod 30. Switch arm 55 and groove 57 are so correlated that the detonator circuit is only closed for activation of the detonator if and when the clamping head is in the locking position of FIG. 2, as will be more fully described hereinafter.

FIG. 2 shows roller 56 within groove 57 while in FIG. 1 the roller has left the groove. Hence, the detonator cannot be activated in the position of the clamping rod shown in FIG. 1.

The operation of the coupling as hereinbefore described is as follows:

Let it be assumed that it is desired to lock engaging coupling member 11 to receiving coupling member 10. To this end, clamping head 32 is fitted into receiving opening 13 and the clamping rod is pressed forward, that is, toward the left as shown in FIG. 1. Such forward movement of the clamping rod can be effected by gripping the end of the clamping rod 30 protruding from wall 21 directly or by activating the utilization device screwed upon the threaded end 31 in a suitable fashion. As previously explained, the clamping rod is so dimensioned that it can slide through opening 13 but the tip 27a of the locking slide will abut against the rim of locking plate 12. As a result, continued forward pressure applied to the clamping rod will force the slide to move backwards in relation to the clamping rod against the action of spring 41. When the clamping head has fully passed through opening 13 so that the portion of rod 30 just adjacent to the clamping head is within opening 13, space now becomes available for the slide within opening 13, and as a result the clamping slide will be snapped forward by the action of spring 41 and into a position within opening 13 alongside rod 30. Moreover, the slide will force the rod into a position in which clamping head 32 thereon overlies the locking plate.

FIG. 2 shows the just described final positions of the clamping rod and the locking slide. As is apparent from the previous description, the engaging coupling member when and while being moved from the position of FIG. 1 into the position of FIG. 2 performs a zig-zag movement and such movement is indicated in FIG. 1 by arrowed lines.

FIG. 2 also shows that in the locked position of the coupling roller 56 on switch arm 55 has travelled from its position resting on the full body of rod 30 into groove 57. As previously explained, this position of the switch arm signifies that the engaging coupling member is fully locked to the receiving coupling member and that the switch in the energizing circuit of the detonator for squib 51 is closed.

FIG. 2 further shows that spring 40 prevents wobbling of the clamping head by pulling the same into the illustrated position and that the depth of box 18 is such that the clamping head in its locked position abuts against the back of wall 18a on box 18, or at least very nearly so for a purpose which will be more fully explained hereinafter.

Let it now be assumed that it is desired to unlock the engaging coupling member and to eject it from the receiving coupling by remote control. To this end, squib 51 is fired by activating some suitable circuitry. Circuitries suitable for the purpose are entirely conventional and a detailed showing thereof is hence not believed to be necessary for the understanding of the invention.

Firing of the squib generates a high pressure shockwave in space 50 between pistons 35 and 37. This shockwave acts upon the pistons in opposite directions, that is, it attempts to move the pistons toward the left and the right respectively. The pressure upon piston 35 remains ineffective since the piston is keyed to rod 30 by pin 36 and head 32 abuts against box wall 18a. If the head is not in direct contact with wall 18a there will be an initial slide movement of the piston which is cushioned by compression of spring 40.

Piston 37 is displaced toward the right against the action of spring 41, wall 21 of housing 20 being held stationary due to the locking of clamping head 32 in plate 12. As a result of the displacement of the piston, slide 27 is withdrawn from receiving opening 13 thereby freeing the clamping head in opening 13.

Piston 37, due to the initially described compression of spring 41, becomes functionally substantially one component with wall 21 and thus also with housing 20. As the wall and the housing are no longer held spatially locked due to the release of the clamping head, the remaining pressure in chamber 50 ejects the engaging coupling member from the receiving coupling member.

To sum up, the shock-wave applies first an impact force upon piston 37 causing unlocking of the clamping rod and then a continuing impact force causing positive ejection or separation of the entire engaging member from the receiving member.

To alleviate the impact force of the pressure on piston 35 the same may have one or several circumferentially elongate bores 35a and similarly, one or several elongate cutouts 23a may be provided in end wall 23 of the housing.

Release of the engaging coupling member from the receiving coupling member may also be effected without using the positive separation action provided by firing squib 51. To effect release without the squib, manual pull may be applied to protruding slide end 27b thereby withdrawing the slide against the action of spring 41, or a suitable remote control device of conventional design may be attached to the slide at its eye 47.

The coupling of FIG. 6 is similar in principle to the coupling of FIGS. 1 to 5 in that detonation of squib 51 first causes unlocking of the clamping head and then positive ejection of the engaging coupling member from the receiving coupling member.

The receiving coupling member 10 of FIG. 6 is the same as previously described. The clamping rod 30 and the locking head 27 have basically the same configuration and dimensions as previously described, but in contradistinction to the first illustrated exemplification of the invention, clamping rod 3 is secured in end wall 23 of housing 20 by suitable means such as a pin 60, or is integral therewith. The slide 27 is slidable in the end wall and secured at its inner end to piston 37 by suitable means such as a pin 61. A spring 62 is interposed between piston 37 and end wall 21. The spring performs the functions of springs 40 and 41 shown in FIGS. 1 and 2, as will be more fully explained hereinafter. The housing of the engaging coupling member may be connected to a suitable utilization device by means of an eye flange 63 or other suitable fastening means.

The engaging coupling member can be locked to the receiving coupling member as previously described. In the locked position clamping head 32 and slide 27 will occupy the same positions as shown in FIG. 2.

Firing of the squib will generate a shock or pressure wave in chamber 64. Such pressure wave may, of course, also be produced by injecting pressurized air into the chamber. The pressure will force piston 37 toward the right in reference to end wall 21 thereby compressing spring 62 until the piston, the spring and wall 21 become functionally a single component. The initial movement of the piston withdraws slide 27 from the receiving opening 13 thereby unlocking clamping head 32. The remaining momentum of the piston movement will cause head 32 and with it the entire engaging coupling member to be forcibly ejected from the receiving coupling member.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. In a two-part coupling in combination:
   a receiving coupling member comprising a member having a receiving opening therethrough; and
   an engaging coupling member comprising:
   a housing including a cylindrical space closed at both ends, one of the end walls of the housing having an opening therethrough;
   a clamping rod supported by the housing and having on one end a one-sidedly overhanging clamping head, said rod extending through said end wall opening with the head protruding therefrom;
   a locking slide lengthwise slidable alongside the clamping rod on the side thereof opposite to the overhang of the head,
   the maximal cross-sectional peripheral outline of the head and also the combined maximal cross-sectional peripheral outline of the rod just below the head and of the slide just fitting the peripheral outline of the receiving opening but the combined maximal cross-sectional peripheral outline of the head and the slide being in excess of the peripheral outline of the receiving opening,
   whereby upon passage of the head through the receiving opening and movement of the slide into the receiving opening the head and with it the engaging coupling member are locked to the receiving coupling member and upon withdrawal of the slide from the receiving opening the head is unlocked for separation of the head and with it of the engaging coupling member from the receiving coupling member;
   a piston slidable within the housing space and defining a chamber between the piston and the housing end wall having said opening, said slide being secured to the piston for movement in unison therewith;
   a spring disposed between the other end wall of the housing and said piston, said spring urging the piston toward a position in which the forward end of the slide is alongside said head;
   a pressure-generating means communicating with said chamber for abruptly generating a pressure wave therein; and
   operating means for activating said pressure generating means for the purpose aforesaid, generation of the pressure in said chamber displacing said piston toward said other end wall of the housing,
   whereby when the engaging coupling member is locked to the receiving coupling member the slide is withdrawn from the receiving opening during the initial part of the piston movement thus unlocking the head and with it the engaging coupling member and during the remaining part of the piston movement the momentum thereof ejects the head from the receiving opening and with it the engaging coupling member from the receiving coupling member.

2. A two-part coupling according to claim 1 wherein said pressure generating means comprises an explosive charge generating when exploded a gas pressure within said chamber, and means for detonating said charge.

3. A two-part coupling according to claim 2 and further comprising a carrier for said explosive charge removably attachable to said housing.

4. A two-part coupling according to claim 1 and further comprising a second piston slidable within said housing space and disposed between said first piston and said end wall having an opening therethrough, said first and second piston constituting the end walls of said chamber, and a spring disposed between said end wall having an opening therethrough and the second piston, said second piston rendering yieldable the respective end wall of the chamber.

5. A two-part coupling according to claim 4 wherein said clamping rod is lengthwise slidable in said housing and secured to the second piston for movement in unison therewith.

6. A two-part coupling according to claim 5 wherein said housing end wall having the opening therethrough and said second piston include vents to facilitate dissipation of the pressure in the direction of said end wall.

7. A two-part coupling according to claim 5 wherein said other end wall of the housing also includes an opening, and said clamping rod protrudes outwardly from said opening in the other end wall, said protruding portion of the rod being adapted to mount a utilization device.

8. A two-part coupling according to claim 1 wherein said pressure generating means comprises an explosive charge generating when exploded a gas pressure within said chamber, an electrically operable detonating means for said charge, and wherein safety means are included in an energizing circuit for said detonating means, said safety means rendering said circuit operative for energization when the clamping rod is in its position for locking the engaging coupling member to the receiving coupling member.

9. A two-part coupling according to claim 8 wherein said safety means comprises a switch means connected in said energizing circuit, said switch means including a switch arm biased into a switch opening position and engageable with a selected portion of the clamping rod when the rod is in its locking position, engagement of the switch arm with said selected rod portion moving the arm into the switch closing position thereby readying said circuit for an energization to effect activation of the detonator means.

10. A two-part coupling according to claim 9 wherein said other end wall of the housing also includes an opening and said clamping rod protrudes from said opening in the other end wall, said protruding rod portion including a recess, said switch arm engaging said recess when the clamping rod is in its locked position thereby releasing the switch arm for movement into the switch closing position.

11. A two-part coupling according to claim 1 wherein said clamping rod is fixedly secured to said one end wall of the housing for conjoint movement of the rod and the housing by the momentum applied by the pressure wave to said piston.

References Cited

UNITED STATES PATENTS

| | | | |
|---|---|---|---|
| 2,948,383 | 8/1960 | Modrey | 24—211 |
| 3,424,050 | 1/1969 | Burrow | 85—81 |
| 3,430,305 | 3/1969 | Geffner. | |

BERNARD A. GELAK, Primary Examiner

U.S. Cl. X.R.

60—26; 85—5, 81